Patented Apr. 9, 1929.

1,708,460

UNITED STATES PATENT OFFICE.

FRED C. ZEISBERG, OF WILMINGTON, DELAWARE, ASSIGNOR TO E. I. DU PONT DE NEMOURS & COMPANY, OF WILMINGTON, DELAWARE, A CORPORATION OF DELAWARE.

PROCESS OF MANUFACTURING ESTERS AND OTHER VALUABLE ORGANIC COMPOUNDS.

No Drawing. Application filed March 26, 1927. Serial No. 178,811.

This invention relates to the process of manufacturing esters and other valuable organic compounds. More particularly it relates to the conversion of ethyl alcohol into ethyl acetate.

One object of my invention is the conversion of an alcohol containing more than one carbon atom into its corresponding ester and other valuable products.

Another object of my invention is the conversion of an alcohol containing more than one carbon atom into an aldehyde, an acid and an ester, in which the yield of ester predominates.

A further object of my invention is the conversion of ethyl alcohol into ethyl acetate, normal butyl alcohol and other valuable organic products.

It is well known, principally through the works of the French savant Sabatier and his collaborators, that when an alcohol vapor is passed over a dehydrogenating (or hydrogenating) catalyst at atmospheric pressure and at an elevated temperature hydrogen is split off and the corresponding aldehyde is obtained. In the case of most of the alcohols the yield of aldehyde is almost quantitative.

Methyl alcohol, however, when thus dehydrogenated, in addition to the hydrogen and aldehyde, yields some carbon monoxide from decomposition of part of the aldehyde formed, as was observed by Sabatier. It also yields appreciable amounts of methyl formate, as was first pointed out by Mannich and Geilmann, Ber. 49,585-6 (1916), presumably from condensation of the aldehyde.

With the exception of U. S. patent to Herman F. Wilkie, No. 1,400,195, entitled "Process of making methyl formate", and U. S. patent to David A. Legg and Charles Bogin, No. 1,580,143, entitled "Production of esters", the literature records no instance where alcohols other than methyl alcohol yield esters in any considerable amount. The U. S. patent to Herman F. Wilkie, No. 1,400,195 confirms the observation of Mannich & Geilmann. The U. S. patent to David A. Legg, et al., No. 1,580,143 covers the conversion of butyl alcohol to butyl butyrate. According to each of these references, these processes are operated at atmospheric pressure.

From a consideration of known laws of physical chemistry, increasing the pressure would be expected to decrease the amount of reaction per passage for the dehydrogenation is accompanied by an increase in volume. This fact would indicate that an attempt at dehydrogenation by increase of pressure would be useless.

I have discovered, however, that if the dehydrogenation of alcohols other than methyl alcohol is carried out under pressure the character of the products obtained undergoes a marked change. Instead of obtaining only acetaldehyde and hydrogen, with at best only small amounts of accompanying ester, the dehydrogenation when conducted under pressure yields the corresponding ester as the principal product, while the corresponding alcohol of twice the number of carbon atoms is formed in considerable amount and the corresponding aldehyde and acid are formed in much less amounts. For example, when using ethyl alcohol as a starting material, the vapor phase dehydrogenation at atmospheric pressure in the presence of copper will give a conversion of 50 per cent of the alcohol per passage, the remaining 50 per cent passing through unchanged. Of the alcohol converted 11 per cent will be converted to the ester, the remainder going to acetaldehyde. When operating under a pressure of 270 atmospheres, for example, 50 per cent of the alcohol is again converted per passage, 5 per cent or slightly more is broken down into carbon monoxide and methane and 45 per cent or so comes through unchanged. Of the alcohol converted about half goes to ethyl acetate, about a fourth goes to normal butyl alcohol and the remaining fourth appears as acetic acid and acetaldehyde. All of these products are useful in the arts and more valuable than the ethyl alcohol from which they are made.

In the following embodiment of the invention, I show by an example, a mode of applying these principles in the production of ethyl acetate. It will be obvious, however, that many modifications in the conditions under which this process can be carried out may be made.

Ethyl alcohol is pumped into a boiling vessel maintained at a temperature above the critical temperature of the alcohol, e. g. 300° C., where it is converted to vapor. This vapor is then conducted to a pressure-resisting tube in which the catalyst is contained. The catalyst consists of copper oxide to which a few percent each of manganese oxide and magnesium oxide have been added, reduced carefully before use and maintained at a temperature of 350° C. The vapor is passed through this catalyst at a rate equal to four volumes of liquid ethyl alcohol for each volume of the catalyst per hour.

The effluent gases are passed under pressure through a condensing coil, when there separates unchanged ethyl alcohol containing in solution about 18 percent by weight of ethyl acetate, 12 percent of normal butanol, 3 percent of acetic acid and 3 percent of acetaldehyde, with smaller amounts of higher boiling oxygenated organic compounds. The uncondensed hydrogen is bled out of the system at such a rate as to maintain the pressure in the system at 275 atmospheres. This hydrogen is, of course, a valuable by-product, as it is of good purity.

The conditions under which the process is carired out can be widely varied without departing from the spirit of my invention. The pressure and temperature may be varied within certain limits. I have found that many of the desirable results of the present invention can be accomplished by using pressures higher than 10 atmospheres. Increased pressure permits the employment of higher operating temperatures without encountering undesired side reactions, thus increasing the productivity of the catalyst. This, in turn, increases the relative amount of the higher alcohol formed. The absolute amount of ester is also increased by increase in temperature, provided this increase is not pushed to the point where decomposition to carbon monoxide, methane and carbon dioxide becomes excessive. This point lies higher the higher the pressure. There is thus an intimate relation between temperature and pressure, differing with the activity of the catalyst, but easily ascertainable by trial, which permits of considerable flexibility in the composition of the product obtained.

It is of course obvious to one skilled in the art that a mixture of alcohols may be employed, in which case mixed esters are obtained, whose relative preponderance depends upon the proportions of the starting material and conditions selected for the reaction.

An incidental advantage of the process, in carrying it into production on the large scale has to do with the thermal effect. Dehydrogenations at atmospheric pressure are strongly endothermic and consequently supplying the necessary amount of heat to the catalyst to maintain the reaction temperature presents a serious problem on the large scale. When conducting the operation under pressure, however, the reaction is much less endothermic and may even become slightly exothermic, thus ameliorating or entirely removing the problem of heat supply.

Catalysts which are suitable for this process are all those catalytic materials which are classed as dehydrogenating agents. Metals such as copper, nickel, cobalt and iron, either alone or in admixture, or with the addition of oxides of other metals, such as manganese oxide, chromium oxide, magnesium oxide or calcium oxide, have proved satisfactory, or oxide catalysts which are known to dehydrogenate alcohols can be used, either singly or in combination. These comprise such materials as zinc oxide, magnesium oxide, chromium oxide, manganese oxide and so on.

As many apparently widely different embodiments of this invention may be made without departing from the spirit thereof, it is to be understood that I do not intend to limit myself to the specific embodiments thereof except as indicated in the appended claims.

I claim:—

1. The process of converting a primary alcohol containing more than one carbon atom into the corresponding ester and other organic products, which comprises vaporizing the alcohol and conducting it over a dehydrogenating catalyst at an elevated temperature and at an elevated pressure.

2. The process of claim 1 in which the catalyst contains dehydrogenating metal and dehydrogenating oxide.

3. The process of converting ethyl alcohol into ethyl acetate, and other organic products including normal butyl alcohol, acetaldehyde and hydrogen, which comprises passing the alcohol over a dehydrogenation catalyst at an elevated temperature and at an elevated pressure.

4. The process of claim 3 in which the catalyst contains dehydrogenating metal.

5. The process of producing ethyl acetate and normal butyl alcohol which comprises vaporizing ethyl alcohol and conducting the resulting vapor over a dehydrogenation catalyst at a temperature ranging from 250 to 500° C. and at a pressure higher than 10 atmospheres.

6. The process of dehydrogenating and condensing a primary alcohol containing more than one carbon atom to form the corresponding ester, which comprises vaporizing the alcohol and conducting the vapors over a dehydrogenating catalyst at a pressure above normal and at a temperature slightly below the point at which, for the pressure employed, excessive decomposition occurs with formation of oxides of carbon.

7. In a process of forming an ester catalytically, the step which comprises passing the vapor of a primary alcohol over a dehydrogenating catalyst at a pressure above 10 atmospheres.

8. In a process of forming an ester catalytically, the step which comprises passing the vapor of the primary alcohol over a dehydrogenating catalyst at a temperature between 250° C. and 500° C. and at a pressure above 10 atmospheres.

9. The process of forming an ester catalytically, which comprises passing the vapor of a primary alcohol over a dehydrogenating catalyst at a temperature between 250° and 500° C. and at a pressure above 10 atmospheres, the dehydrogenating catalyst comprising a metal and a metallic oxide having dehydrogenating action.

10. The process of converting over 10% of a primary alcohol into the corresponding ester, which comprises passing the vapor of the alcohol over a dehydrogenating catalyst at a temperature above 250° C. and at a pressure above 10 atmospheres.

In testimony whereof I affix my signature.

FRED C. ZEISBERG.